US012591758B1

(12) United States Patent
Chauvin et al.

(10) Patent No.: US 12,591,758 B1
(45) Date of Patent: Mar. 31, 2026

(54) SYSTEMS AND METHODS FOR EXTENDING NEAR-FIELD COMMUNICATION OPERATING VOLUME

(71) Applicant: Apple Inc., Cupertino, CA (US)

(72) Inventors: Vincent Chauvin, Woodside, CA (US); Peter M Agboh, Bend, OR (US); Sireesha Ramisetti, Sunnyvale, CA (US); Vusthla Sunil Reddy, Cupertino, CA (US); Yukang Feng, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/900,164

(22) Filed: Sep. 27, 2024

(51) Int. Cl.
*G06K 19/077* (2006.01)
*H04B 5/48* (2024.01)

(52) U.S. Cl.
CPC ......... *G06K 19/07773* (2013.01); *H04B 5/48* (2024.01)

(58) Field of Classification Search
CPC ............................ G06K 19/07773; H04B 5/48
See application file for complete search history.

(56) References Cited

U.S. PATENT DOCUMENTS

| | | | |
|---|---|---|---|
| 8,417,187 B2 | 4/2013 | Chen et al. | |
| 2014/0127993 A1* | 5/2014 | Frankland | G06K 19/0726 455/41.1 |
| 2017/0272127 A1 | 9/2017 | Jang et al. | |
| 2018/0189626 A1 | 7/2018 | Gila et al. | |
| 2020/0389208 A1* | 12/2020 | Kim | H04B 5/77 |

* cited by examiner

*Primary Examiner* — Matthew Mikels
(74) *Attorney, Agent, or Firm* — FLETCHER YODER PC

(57) ABSTRACT

An operating volume of the NFC transceiver of the electronic device may be extended or enhanced via a resonating circuit disposed in a case that attaches to or covers an electronic device. The resonating circuit disposed in the case may amplify an NFC signal output by the NFC transceiver of the electronic device, extending or enhancing the operating volume of the NFC transceiver of the electronic device such that an external NFC antenna may communicatively couple to the NFC transceiver of the electronic device at a greater distance from the NFC transceiver of the electronic device than would otherwise be possible without the resonating circuit. Extending or enhancing the operating volume may enable the NFC transceiver of the electronic device to perform actions such as executing transactions, receiving information, transmitting information, and so on at a greater distance than otherwise possible, improving ease of use and user experience.

20 Claims, 7 Drawing Sheets

SYSTEMS AND METHODS FOR EXTENDING NEAR-FIELD COMMUNICATION OPERATING VOLUME

BACKGROUND

The present disclosure relates generally to near-field communication for a mobile electronic device.

An electronic device may be capable of communicating via various protocols, such as Wi-Fi, Bluetooth, near-field communication (NFC), and so on. These protocols may enable communication between two nearby NFC-capable devices. For example, an electronic device may transmit, via an NFC transmitter coupled to a first antenna, an NFC signal to be received by an external device. The external device may receive, via a second antenna coupled to an NFC receiver, the NFC signal. However, in some instances, an operating volume of the NFC transmitter of the electronic device may be insufficient and thus unable to adequately reach the second antenna of the external device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, there may be a case for an electronic device, the electronic device including a first near-field communication (NFC) transceiver including a coil, the NFC transceiver may be configured to enable communication with an external NFC device. The case may include a body enabled to attached to and cover at least a portion of a housing of the electronic device; and a resonating circuit for adjusting a magnetic field emitted by the electronic device to enable the communication between the electronic device and the external NFC device.

In another embodiment, a case may include a resonating circuit disposed within a portion of the case; and a magnet.

In yet another embodiment, a tangible, non-transitory, computer-readable medium, may include instructions that, when executed, may cause processing circuitry to: receive an indication of a signal-augmenting accessory; and adjust a transmission signal or a reception signal based on the indication.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
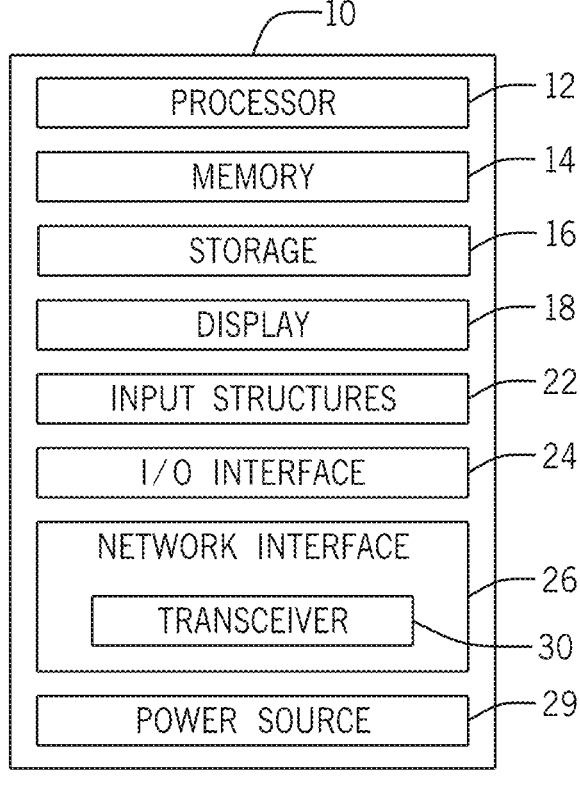
FIG. 1 is a block diagram of an electronic device, according to embodiments of the present disclosure.

When introducing elements of various embodiments of the present disclosure, the articles "a." "an," and "the" are intended to mean that there are one or more of the elements. The terms "comprising." "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately." "near." "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

An electronic device may be capable of communicating via various protocols, such as cellular, Wi-Fi, Bluetooth, near-field communication (NFC), ultra-wideband (UWB), and other communication protocols. In particular, NFC may enable communication between two nearby NFC-capable devices such as active devices (e.g., electronic devices, such as NFC readers, mobile devices), passive devices (e.g., bank cards), and so on. For example, an electronic device may transmit, via an NFC transmitter coupled to a first antenna, an NFC signal to be received by an external device (e.g., via a second antenna). The external device may receive, via the second antenna and an NFC receiver, the NFC signal. However, in some instances, an operating volume of the NFC transmitter of the electronic device may be insufficient and thus the NFC signal transmitted by the electronic device may be unable to reach the second antenna of the external device, which may prevent execution of a desired transaction. The operating volume, as used herein, may be defined as a volume of space in which the NFC transmitter may be able to reach and communicatively couple to an antenna of an external device (e.g., coupled to an NFC receiver of a second electronic device, an antenna disposed within a bank card or other passive NFC device, and so on).

The operating volume of an NFC transceiver (including, for example, both an NFC transmitter and an NFC receiver) of the electronic device may be extended or enhanced via a resonating circuit (e.g., a resonating coil of conductive material and a capacitor) disposed in a case that attaches to or covers the electronic device. The resonating circuit disposed in the case may amplify an NFC signal output by the NFC transceiver of the electronic device, extending or enhancing the operating volume of the NFC transceiver of the electronic device such that an external transceiver may communicatively couple to the NFC transceiver of the electronic device at a greater distance from the NFC transceiver of the electronic device than would otherwise be possible without the resonating circuit. In other words, the resonating coil may increase a radiation area of an NFC signal associated with the NFC transceiver of the electronic device. Extending or enhancing the operating volume may enable the NFC transceiver of the electronic device to perform actions such as executing transactions, receiving information, transmitting information, and so on at a greater distance than otherwise possible, improving ease of use and user experience.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer, a portable electronic or handheld electronic device such as a wireless electronic device or smartphone, a tablet, a wearable electronic device, and other similar devices. In additional or alternative embodiments, the electronic device 10 may include an access point, such as a base station, a router (e.g., a wireless or Wi-Fi router), a hub, a switch, and so on. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector, a universal serial bus (USB), or other similar connector and protocol. The network interface 26 may include, for example, one or more interfaces for a personal area network (PAN), such as an ultra-wideband (UWB) or a BLUETOOTH network, a local area network (LAN) or wireless local area network (WLAN), such as a network employing one of the IEEE 802.11x family of protocols (e.g., WI-FI), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, Long Term Evolution (LTE) cellular network, Long Term Evolution License Assisted Access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX), mobile broadband Wireless networks (mobile WIMAX), asynchronous digital subscriber lines (e.g., ADSL, VDSL), digital video broadcasting-terrestrial (DVB-T) network and its extension DVB Handheld (DVB-H) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. As will be discussed in greater detail below, the transceiver 30 may include various transceivers that facilitate communication with external devices over various types of communication protocols. For example, the transceiver 30 may perform cellular communication, Wi-Fi communication, NFC or other short-range communication such as UWB, and so on. The power source 29 of the electronic device 10 may include any suitable source of power, such as a rechargeable lithium polymer (Li-poly) battery and/or an alternating current (AC) power converter.

Figure 2:
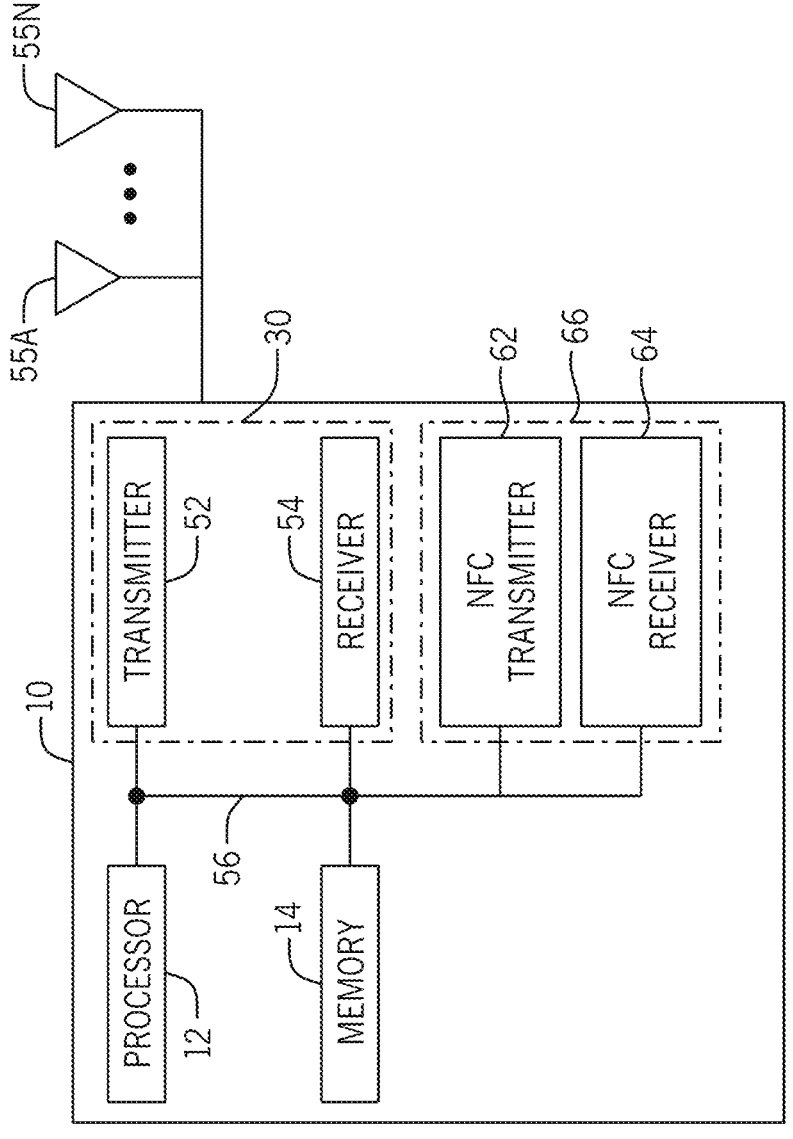
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the electronic device 10 may include multiple transceivers, such as a first transceiver 30 (having a transmitter 52 and a receiver 54) for cellular communication via, for example, a network (e.g., including base stations or access points) or a direct connection, and an NFC transceiver 66 (having an NFC transmitter 62 and an NFC receiver 64) for communicating via NFC communication protocols. In some embodiments, the transceiver 30, 66 may be combined in a single transceiver, the transmitters 52, 62 may be combined in a single transmitter, and the receivers 54, 64 may be combined in a single receiver. Moreover, the transceiver 30 and the NFC transceiver 66 may be combined into a single transceiver. In some instances, the NFC transmitter 62 and/or the NFC receiver 64 may include a conductive coil. As illustrated, the processor 12, the memory 14, the transceiver 30, the transmitter 52, the receiver 54, the NFC transceiver 66, the NFC transmitter 62, the NFC receiver 64, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another. In some embodiments, the NFC transmitter 62, the NFC receiver 64, or both may include respective coils of conductive wire.

The electronic device 10 may also have one or more antennas 55A-55N electrically coupled to the transceivers 30 and/or 66. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

As mentioned above, the operating volume of the NFC transceiver 66 of the electronic device 10 may be extended or enhanced via a resonating circuit disposed in a case that attaches to or covers the electronic device. The resonating circuit disposed in the case may amplify an NFC signal output by the NFC transceiver 66 of the electronic device 10, extending or enhancing the operating volume of the NFC transceiver 66 such that an external NFC transceiver (e.g., an NFC transceiver of a second electronic device) may communicatively couple to the NFC transceiver 66 at a greater distance than would otherwise be possible without the resonating circuit.

Figure 3:
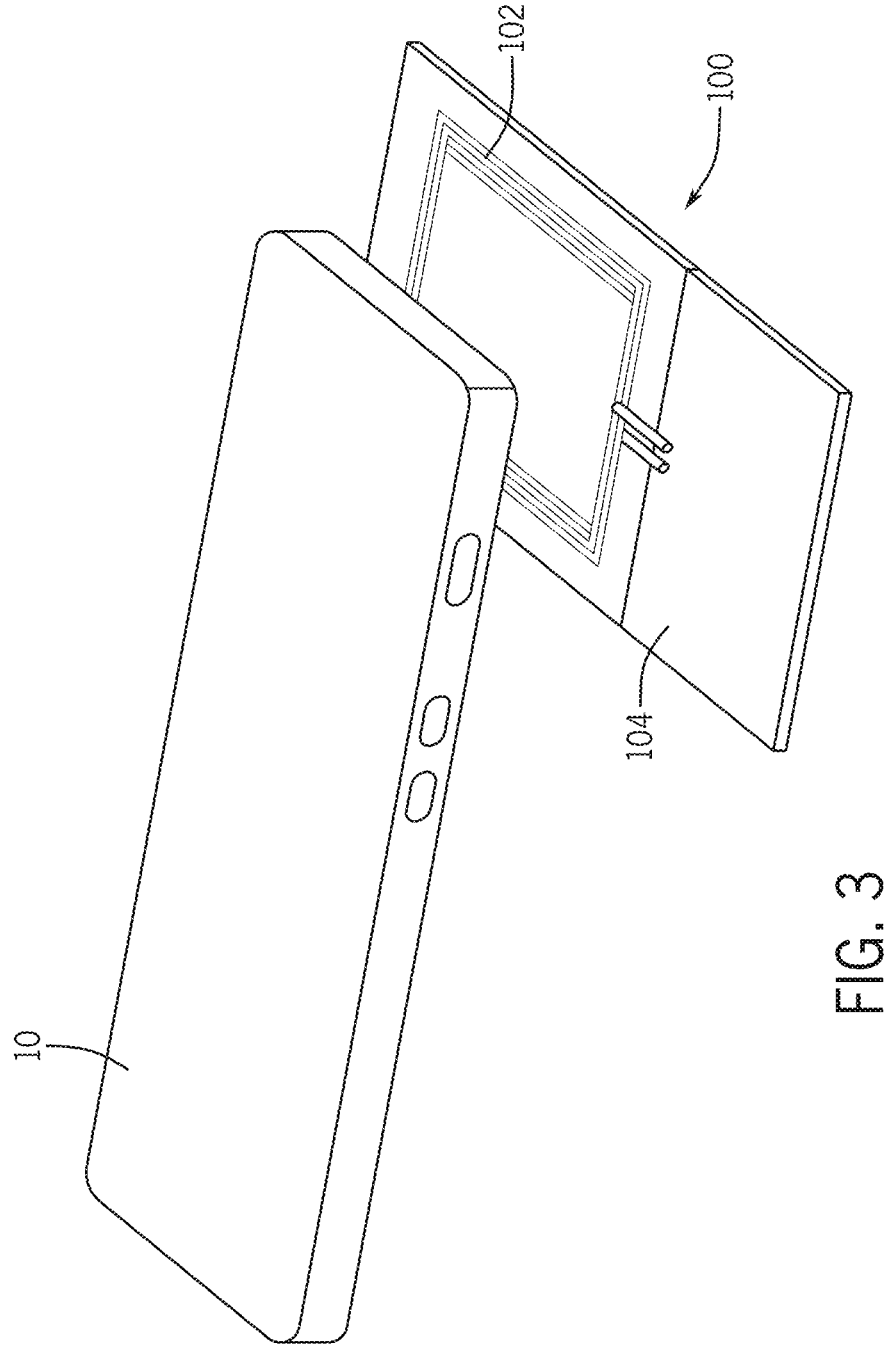
FIG. 3 illustrates the electronic device described with respect to FIG. 1 interacting with a resonating circuit configured to amplify a signal transmitted by the electronic device, according to embodiments of the present disclosure.

FIG. 3 illustrates the electronic device 10 interacting with a resonating circuit 100 configured to amplify a signal (e.g., NFC signal) transmitted by the electronic device 10, according to embodiments of the present disclosure. The resonating circuit 100 includes a resonating coil 102 and a capacitor 104. The resonating coil 102 may receive and amplify the NFC signal transmitted by the NFC transceiver 66 in conjunction with the capacitor 104. The capacitor 104 may be rated to tune the resonating coil 102 at a frequency corresponding to the NFC signal transmitted by the NFC transceiver 66. The resonating coil 102 may be tuned based on a center frequency and/or or a resonating frequency associated with the NFC signal and the geometry of the resonating coil 102 (as will be discussed in greater detail with respect to FIGS. 5-6 below), among other considerations. Because the center frequency and/or resonating frequency may change according to application, it may be desirable in some embodiments to have processing circuitry and a varactor coupled to the capacitor 104 to dynamically tune the capacitor 104 based on the parameters of a given application. That is, while in some embodiments the capacitor 104 may be non-tunable (e.g., static) once in the electronic device 10, in other embodiments, the capacitor 104 may include a dynamic tuning capacitor that may be tuned in real-time.

Figure 4:
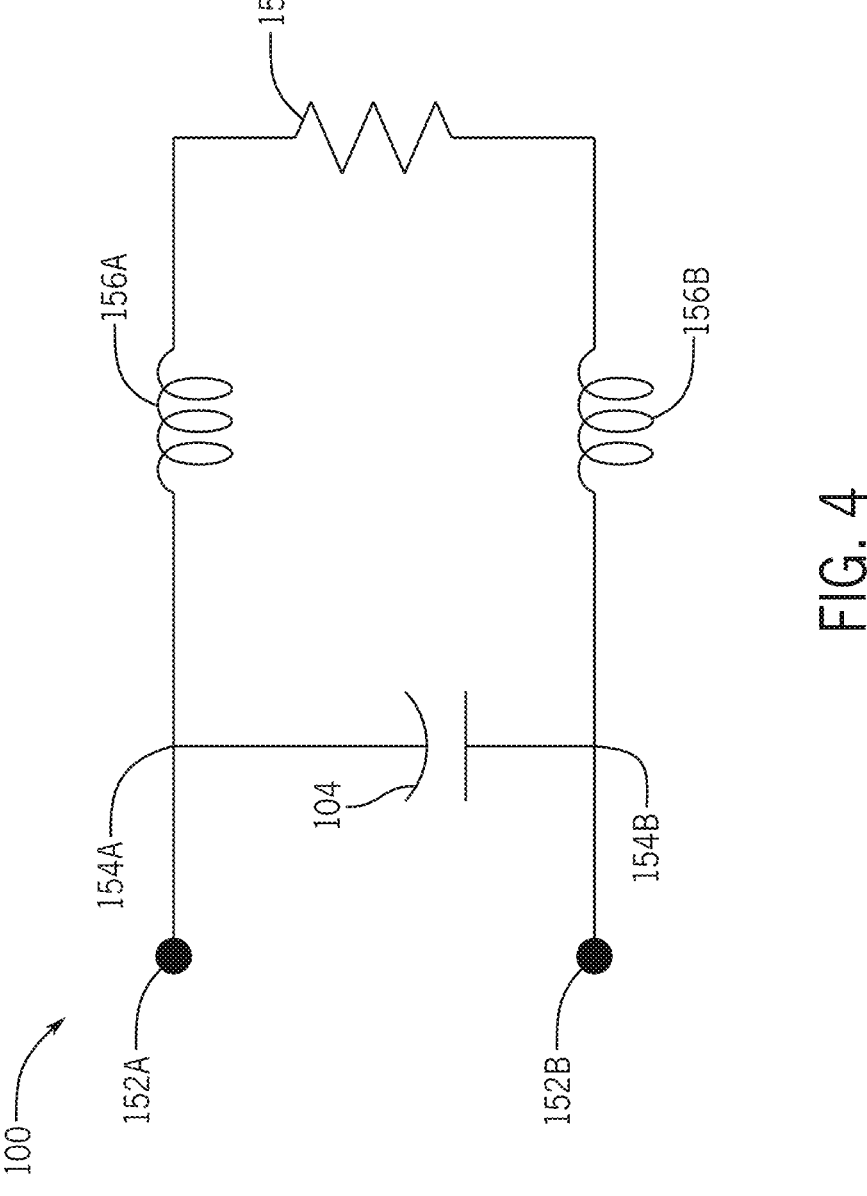
FIG. 4 is a schematic diagram of the resonating circuit described with respect to FIG. 3, according to embodiments of the present disclosure.

FIG. 4 is a schematic diagram of the resonating circuit 100, according to embodiments of the present disclosure. The resonating circuit 100 may, when placed near the electronic device 10, enhance the operating volume of the NFC transceiver 66. As previously mentioned, the resonating circuit 100 may act as an amplifier for the NFC signal emitted by the NFC transmitter 62, boosting the NFC signal and extending the radiation area (e.g., extending the operating volume) at which an external, receiving antenna may be energized and communicatively couple to the NFC transceiver 66 of the electronic device 10. The resonating circuit 100 may include the capacitor 104 coupled between a first input port 152A at a first node 154A and a second input port 152B at a second node 154B. A first end of a first inductor 156A may be coupled to the first input port 152A at the first node 154A, and a first end of a second inductor 156B may be coupled at the second input port 152B at the second node 154B. A resistor 158 may be coupled to a second end of the first inductor 156A and a second end of the second inductor 156B. The input ports 152A and 152B may communicatively couple (e.g., via capacitive coupling or inductive coupling) to the NFC transceiver 66 of the electronic device 10, such as when current is applied to the NFC transceiver 66 and/or when the NFC transceiver 66 is in operation.

Figure 5:
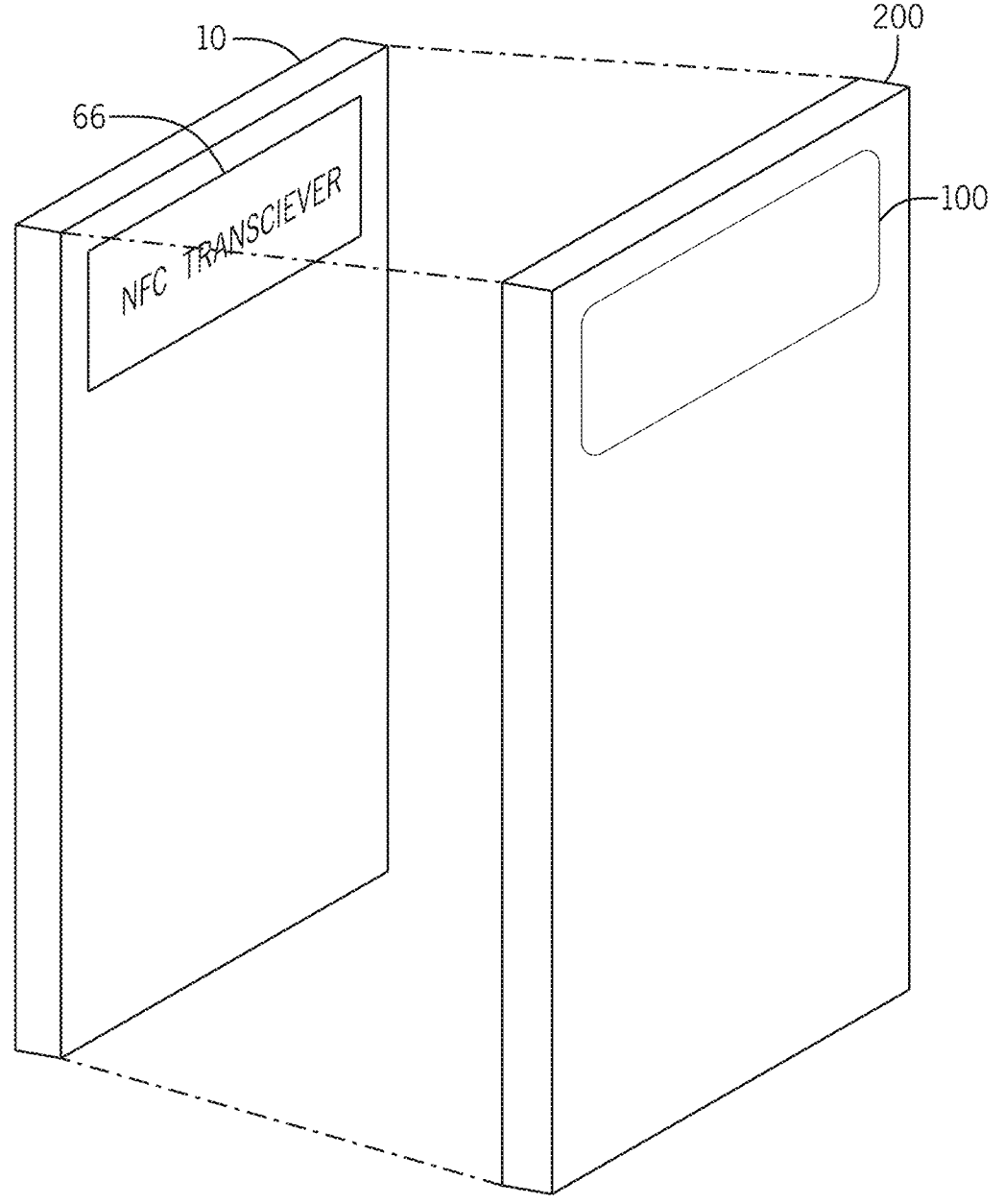
FIG. 5 illustrates a device case in which the resonating circuit described with respect to FIGS. 3-4 may be disposed, according to embodiments of the present disclosure.

FIG. 5 illustrates a device case 200 that may be removably attached to the electronic device 10, the device case 200 having the resonating circuit 100 that may enhance an operating volume of the NFC transceiver 66 of the electronic device 10, according to embodiments of the present disclosure. The device case 200 may fit, attached, or couple to a mobile device such as a smartphone, tablet, laptop, wearable device, and so on. The device case 200 may, in some instances, be capable of facilitating wireless charging (e.g., via Qi technology, MagSafe technology, and so on). In the instances wherein the device case 200 is capable of facilitating wireless charging, the device case 200 may include a magnet disposed in at least a portion of the device case 200. As illustrated, the resonating circuit 100 may be disposed in a rectangular geometry near a top portion of the device case 200 and may substantially extend the width of the case. However, this is merely illustrative, and the resonating circuit 100 may take the form of other geometric shapes, such as (but not limited to) a square, a circle, an oval, a parallelogram, another polygon, or any other appropriate geometry. Moreover, while the resonating circuit 100 is illustrated at the top portion of the device case 200, the resonating circuit 100 may be disposed at any location on the device case 200, such as (but not limited to) the bottom or lateral peripheries, away from the periphery toward the center, and so on. In some embodiments, the resonating circuit 100 may be disposed in the device case 200 at a location corresponding to the NFC transceiver 66 or the transceiver 30 in the electronic device 10, depending on what type of signal the resonating circuit 100 is designed to amplify. That is, if the NFC transceiver 66 or the transceiver 30 is disposed in the electronic device 10 toward the upper-most periphery and the resonating circuit 100 is intended to boost the NFC signal transmitted from the NFC transceiver 66 or the transceiver 30, the resonating circuit 100 may be disposed at the upper-most periphery of the device case 200 in the area corresponding to the NFC transceiver 66 or the transceiver 30.

Figure 6:
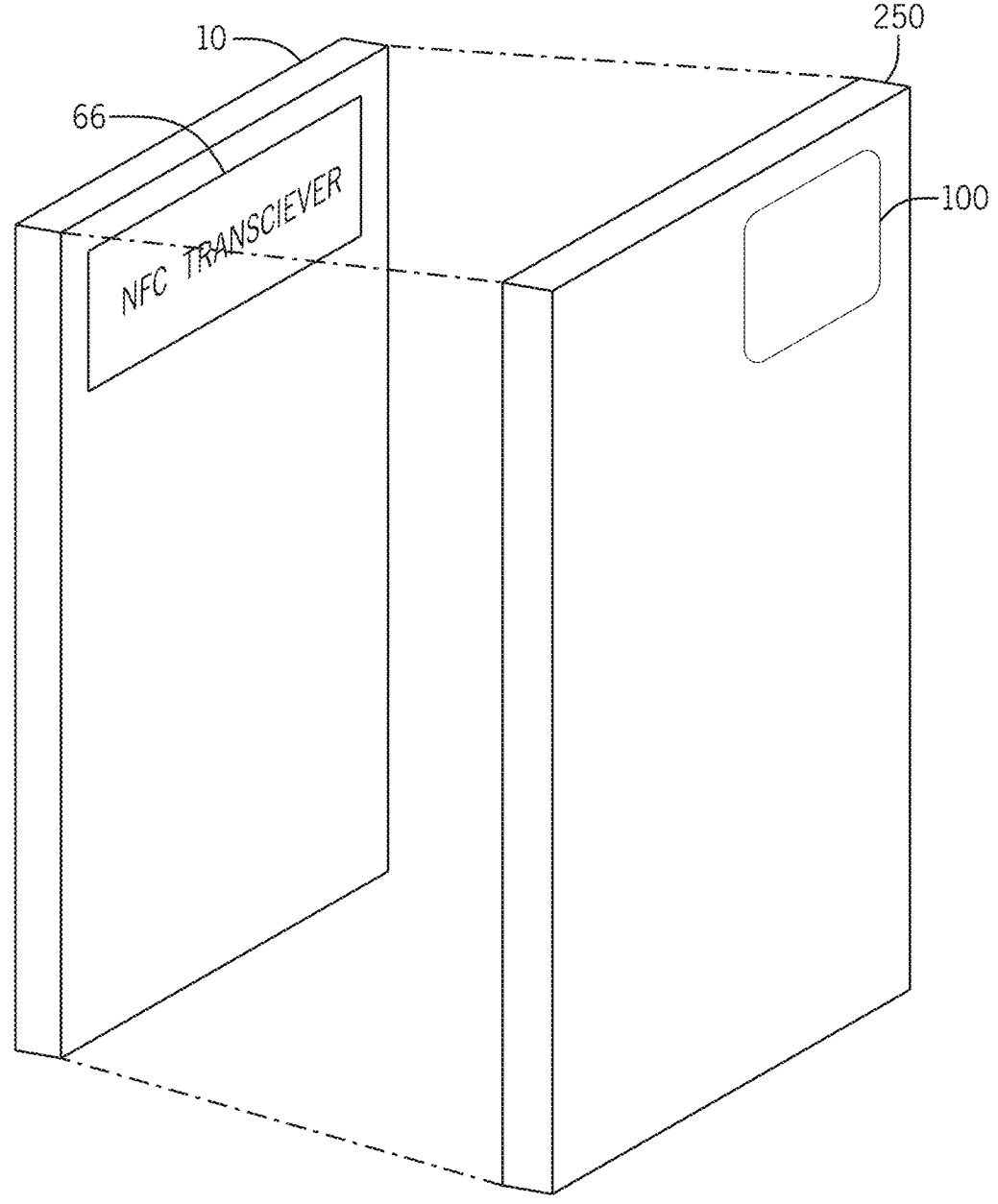
FIG. 6 illustrates the device case described with respect to FIG. 5 having a different resonating circuit size and geometry, according to embodiments of the present disclosure.

FIG. 6 illustrates a device case 250 that may be removably attached to the electronic device 10, the device case 250 having the resonating circuit 100 disposed such that the resonating circuit 100 has a different size and shape than the resonating circuit 100 shown in the device case 200 described with respect to FIG. 5, according to embodiments of the present disclosure. Similar to the embodiments discussed above with respect to FIG. 5, the device case 250 may, in some instances, be capable of facilitating wireless charging (e.g., via Qi technology, MagSafe technology, and so on). In the instances wherein the device case 250 is capable of facilitating wireless charging, the device case 200 may include a magnet disposed in at least a portion of the device case 250. As illustrated, the resonating circuit 100 may be in the shape of a square near the top portion of the device case 250, and extending approximately one-half the width of the case. However, this is merely illustrative, and the resonating circuit 100 may take the form of other geometric patterns, such as (but not limited to) a circle, an oval, a parallelogram, another polygon, or any other appropriate geometry. The resonating circuit 100 may extend, in other embodiments, approximately one-fourth the width of the case, one-third the width of the case, and so on. Moreover, while the resonating circuit 100 is illustrated at the top portion of the device case 250, the resonating circuit 100 may be disposed at any location on the device case 250, such as (but not limited to) the bottom or lateral peripheries, away from the periphery toward the center, and so on. In some embodiments, the resonating circuit 100 may be disposed in the device case 250 at a location corresponding to the NFC transceiver 66 or the transceiver 30 in the electronic device 10, depending on what type of signal the resonating circuit 100 is intended to amplify. That is, if the NFC transceiver 66 and/or the transceiver 30 is disposed in the electronic device 10 toward the upper-most periphery and the resonating circuit 100 is intended to boost the NFC signal transmitted from the NFC transceiver 66 and/or another signal transmitted from transceiver 30, the resonating circuit 100 may be disposed at the upper-most periphery of the device case 250 in the area corresponding to the NFC transceiver 66 and/or the transceiver 30.

In some instances, the resonating circuit 100 may cause interference with other communication systems (e.g., cellular communication, Wi-Fi communication, Bluetooth communication, UWB communication, global navigation satellite system (GNSS) communication, and so on) of the electronic device 10. To reduce or eliminate the interference, the electronic device 10 may determine the presence of the resonating circuit 100, and may adjust behavior of certain componentry within the electronic device (e.g., the transceiver 30), such as by adjusting times, frequency, and/or power of different communications.

Figure 7:
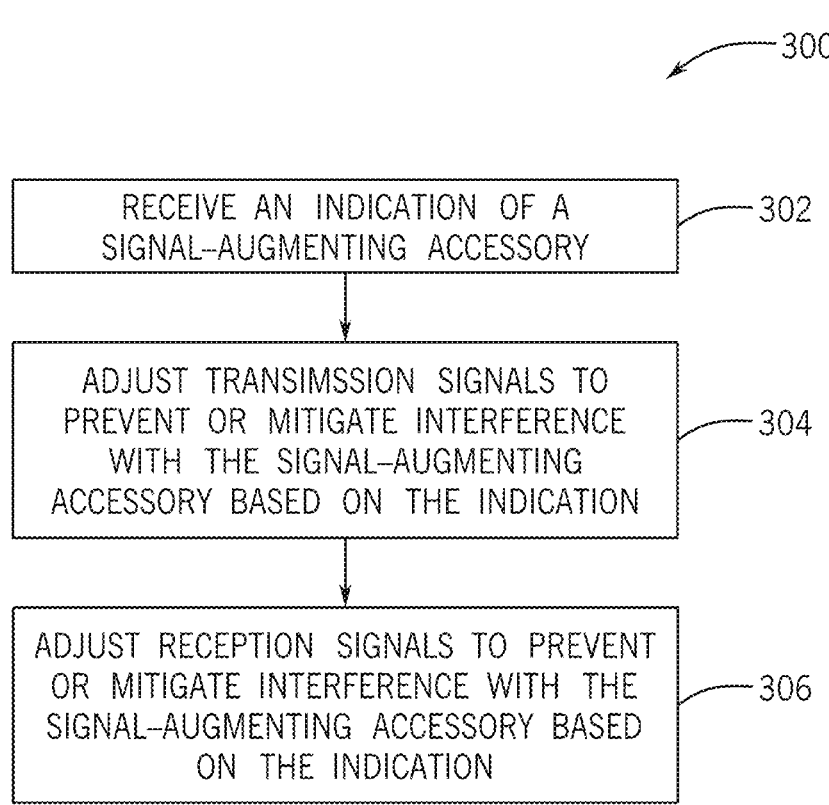
FIG. 7 is a flowchart of a method for the electronic device to adjust one or more settings to reduce or eliminate interference caused by the resonating circuit, according to embodiments of the present disclosure.

With the foregoing in mind, FIG. 7 is a flowchart of a method 300 for the electronic device 10 to adjust one or more settings to reduce or eliminate interference caused by the resonating circuit 100, according to embodiments of the present disclosure. Any suitable device (e.g., a controller) that may control components of the electronic device 10, such as the processor 12, may perform the method 300. In some embodiments, the method 300 may be implemented by executing instructions stored in a tangible, non-transitory, computer-readable medium, such as the memory 14 or storage 16, using the processor 12. For example, the method 300 may be performed at least in part by one or more software components, such as an operating system of the electronic device 10, one or more software applications of the electronic device 10, and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the processor 12 receives an indication of a signal-augmenting accessory. For example, the processor 12 may receive an indication that the device case 200, 250 (having the signal-amplifier resonating circuit 100) is attached to the electronic device 10. In some embodiments, the processor 12 may detect the indication, for example, by receiving the indication as a communication signal (e.g., via a network interface). In other embodiments, the indication may be manually input into the device settings by a user, and so on. In process block 304, the electronic device 10 may adjust transmission signals to prevent or mitigate interference with the signal-augmenting accessor based on the indication. For example, the processor 12 may cause the transmitter 52 to adjust transmit settings based on determining that the device case 200, 250 is placed on the electronic device 10. These settings may include increasing or decreasing transmit power relating to cellular data transmission, Wi-Fi transmission, and so on. Additionally or alternatively, the processor 12 may also adjust a frequency and/or time at which the transmitter 52 is transmitting. In process block 306, the processor 12 may cause the receiver 54 to adjust receive settings based on determining that the device case 200, 250 is placed on the electronic device 10. These settings may include increasing or decreasing receive power relating to cellular data reception, Wi-Fi reception, and so on. Additionally or alternatively, the processor 12 may adjust a frequency and/or time at which the receiver 54 receives is receiving.

In other embodiments, the processor 12 may determine, based on transmission of the NFC signal, that an NFC transaction is being attempted, and may enter a mobile transaction mode. In the mobile transaction mode, the actions discussed with respect to the process blocks 304 and 306 may be performed to reduce or eliminate interference that may occur on the transceiver 30 due to the NFC communications associated with the NFC transaction. In this manner, the method 300 enables the electronic device 10 to reduce or eliminate interference caused by the resonating circuit 100.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A case for an electronic device, the electronic device comprising a first near-field communication (NFC) transceiver including a coil, the NFC transceiver configured to enable communication with an external NFC device, the case comprising:
   a body enabled to attach to and cover at least a portion of a housing of the electronic device; and
   a resonating circuit for adjusting a magnetic field emitted by the electronic device to enable the communication between the electronic device and the external NFC device, wherein the resonating circuit comprises:

a capacitor comprising a first terminal and a second terminal;
   a first inductor comprising a third terminal electrically coupled to the first terminal; and
   a second inductor comprising a fourth terminal electrically coupled to the second terminal.

2. The case of claim 1, wherein the external NFC device comprises a passive NFC device.

3. The case of claim 2, wherein the passive NFC device comprises a bank card.

4. The case of claim 1, wherein the external NFC device comprises an active NFC reader.

5. The case of claim 1, wherein the electronic device comprises a mobile device.

6. The case of claim 1, wherein adjusting the magnetic field emitted by the electronic device comprises increasing an energy of the magnetic field.

7. The case of claim 1, wherein adjusting the magnetic field emitted by the electronic device comprises adjusting a radiation area covered by the magnetic field.

8. The case of claim 1, wherein near-field radio signal communication enabled by the NFC transceiver of the electronic device includes data for performing a transaction.

9. The case of claim 1, wherein upon detecting the communication, the electronic device is set into a mobile transaction mode to mitigate interference from radio signals other than the communication.

10. The case of claim 1, the resonating circuit further comprising an auxiliary coil.

11. The case of claim 1, wherein the capacitor is rated so as to tune the coil at a frequency corresponding to the communication.

12. The case of claim 1, wherein the capacitor comprises a dynamic capacitor.

13. The case of claim 1, wherein the body is enabled to be removably attached to the housing of the electronic device.

14. A case comprising:
   a resonating circuit disposed within a portion of the case, wherein the resonating circuit comprises:
      a capacitor comprising a first terminal and a second terminal;
      a first inductor comprising a third terminal electrically coupled to the first terminal; and
      a second inductor comprising a fourth terminal electrically coupled to the second terminal; and
   a magnet.

15. The case of claim 14, wherein the capacitor is configured to enhance an operating volume of a transmitter of an electronic device when the electronic device is in the case.

16. The case of claim 14, wherein the resonating circuit is disposed in a loop substantially extending a width of the case.

17. The case of claim 14, wherein the resonating circuit is disposed in a loop extending to at least one-half a width of the case.

18. A tangible, non-transitory, computer-readable medium, comprising instructions that, when executed, cause processing circuitry to:
   receive an indication of a signal-augmenting accessory; and
   adjust a transmission signal or a reception signal based on the indication.

19. The tangible, non-transitory, computer-readable medium of claim 18, wherein adjusting the transmission signal comprises increasing a transmission power at which the transmission signal is transmitted, and wherein adjusting the reception signal comprises increasing a reception power at which the reception signal is received.

20. The tangible, non-transitory, computer-readable medium of claim 18, wherein the transmission signal or the reception signal comprises a Wi-Fi signal.

* * * * *